A. MORLEY.
Improvement in Nut-Lock.
No. 127,359.　　　　　　　　　　　Patented May 28, 1872.
Fig. 1.
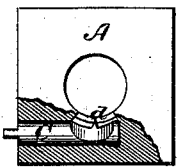
Fig. 2.
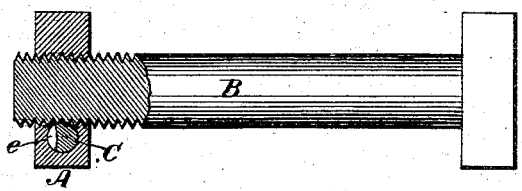
Fig. 3.　　　Fig. 4.
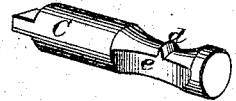　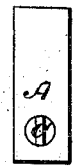
Witnesses.　　　　　　　　　　　Inventor.
Chas. F. Brown.　　　　　　　　Albert Morley,
D. K. Ellsworth.　　　　　　　By Hill & Ellsworth
　　　　　　　　　　　　　　　　His Attys.

127,359

UNITED STATES PATENT OFFICE.

ALBERT MORLEY, OF NEW TROY, MICHIGAN.

IMPROVEMENT IN NUT-LOCKS.

Specification forming part of Letters Patent No. 127,359, dated May 28, 1872.

*To all whom it may concern:*

Be it known that I, ALBERT MORLEY, of New Troy, in the county of Berrien and State of Michigan, have invented a new and Improved Nut-Lock; and I do hereby declare the following to be a full and exact description of the same, reference being had to the accompanying drawing forming part of this specification, in which—

Figure 1 is a plan view of my improved nut, partly broken away to show its construction. Fig. 2 is a sectional view of the nut applied to a bolt, the latter being also partly in section. Fig. 3 is a perspective view of the locking-key; and Fig. 4 is a side elevation of the nut.

Similar letters of reference in the accompanying drawing denote the same parts.

My invention has for its object to provide simple and effective means for locking nuts upon bolts beyond the possibility of casual displacement. To this end the invention consists in providing the nut with a lateral key having a short steel stud formed upon its side, which, when the nut is applied to a bolt and the key turned, shall be projected into the bolt-hole to engage the screw-thread of the bolt transversely. By this means the nut is prevented from turning upon the bolt until the key is operated to retract the stud, when the nut may be easily unscrewed.

In the accompanying drawing, A is a metal nut applied to a bolt, B, in the usual manner. C is the key, constructed with a flattened head to be grasped by a wrench and let into the side of the nut so as to strike the bolt-hole tangentially. *d* is a short steel stud formed upon one side of the key, of sufficient length to enter the bolt-hole of the nut. Inasmuch as the stud is made sharp, it cuts into the thread of the bolt, and effectually locks the nut in place.

To unlock the nut, the key must first be turned to retract the stud and carry the concave side *e* of such key opposite the bolt, when the nut may be unscrewed in the usual manner.

The construction of the locking-key forms a very important feature of my invention for the following reasons—to wit: First, it must fit tightly within the nut to prevent accidental turning. Secondly, it must fit tightly, carry the lateral stud, and be capable of application to and removal from the nut. Thirdly, it must be capable of turning, so that the stud only shall come in contact with the thread of the bolt.

To produce these requisites I form the stud on a concave face of the key, so that its point shall not project beyond the circumference of the key. This construction admits of its removal from the nut, while the spaces on each side of the stud allow it to be turned so that the stud only shall engage with the bolt, as will be readily understood.

In carrying out my invention I design to supply the trade with the nuts already provided with the locking-key as a complete article of manufacture.

Having thus fully described my invention, what I claim as new, and desire to secure by Letters Patent, is—

1. As a new article of manufacture, a nut for bolts, provided with the adjustable locking-key C, substantially as described, for the purpose specified.

2. The key C for locking nuts upon bolts, constructed with side recesses and a lateral stud *d*, substantially as described, for the purpose specified.

ALBERT MORLEY.

Witnesses:
AMBROSE A. MORLEY,
EMORY M. PLIMPTON.